(12) United States Patent  
Lee

(10) Patent No.: US 8,099,751 B2  
(45) Date of Patent: Jan. 17, 2012

(54) APPARATUS AND METHOD FOR DISPLAYING DIGITAL MULTIMEDIA BROADCASTING SERVICE

(75) Inventor: Sung Chull Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 12/264,322

(22) Filed: Nov. 4, 2008

(65) Prior Publication Data

US 2009/0187952 A1    Jul. 23, 2009

(30) Foreign Application Priority Data

Jan. 23, 2008    (KR) ........................ 10-2008-0007157

(51) Int. Cl.
*G06F 13/00* (2006.01)
*G06F 3/00* (2006.01)
*H04N 5/443* (2006.01)

(52) U.S. Cl. ............................... 725/43; 725/41; 725/51

(58) Field of Classification Search .................... 725/40, 725/43, 51, 118
See application file for complete search history.

(56) References Cited

U.S. PATENT DOCUMENTS

2006/0130115 A1*    6/2006    Park .............................. 725/118
* cited by examiner

*Primary Examiner* — Hunter Lonsberry
(74) *Attorney, Agent, or Firm* — Jefferson IP Law, LLP

(57) ABSTRACT

An apparatus and method for displaying a digital multimedia broadcasting (DMB) service, which is capable of always displaying a dynamic label service (DLS) of a digital audio broadcasting (DAB) signal in a ticker form in a digital multimedia broadcasting receiver. A method of displaying a digital multimedia broadcasting service includes determining whether additional data carried in a digital audio broadcasting (DAB) signal is received while any application is being executed; and displaying the executed application and the received additional data together on one screen when the additional data is received. Accordingly, since news information or traffic information can be always received in the DMB receiver even during the execution of any application, it is possible to make the DMB receiver more convenient for a user.

25 Claims, 16 Drawing Sheets

APPARATUS AND METHOD FOR DISPLAYING DIGITAL MULTIMEDIA BROADCASTING SERVICE

CROSS-REFERENCE TO RELATED APPLICATIONS

This application claims the benefit of Korean Patent Application No. 2008-7157 filed on Jan. 23, 2008, in the Korean Intellectual Property Office, the disclosure of which is incorporated herein by reference in its entirety.

BACKGROUND OF THE INVENTION

1. Field of the Invention

Aspects of the invention relate to an apparatus and method for displaying a digital multimedia broadcasting service that is capable of displaying a digital audio broadcasting (DAB) dynamic label service (DLS) in a ticker form in a digital multimedia broadcasting receiver.

2. Description of the Related Art

Digital audio broadcasting (hereinafter referred to as DAB) for simultaneously providing a CD-quality audio service and a data service can support MPEG-1 audio and MPEG-2 audio and provide traffic information and web data.

Recently, digital multimedia broadcasting (hereinafter referred to as DMB), which is an expansion of the DAB standard that provides a multimedia broadcasting service including both audio and video, has been attracting much attention as a next-generation broadcasting technology. DMB was developed from, and is an extension of, DAB, and employs an MPEG-4/AVC (Advanced Video Coding) (H.264) scheme for video, an MPEG-4/BSAC (Bit-Sliced Arithmetic Coding) scheme or an MPEG-4/HE-AAC V2 (High Efficiency Advanced Audio Coding) scheme for audio, and an MPEG-2 transport stream. Thus, in addition to the audio service and the data service provided by DAB, DMB can also provide a video service using the MPEG-4 standard.

Accordingly, DMB can provide a main broadcasting service including video and audio, such as a play or a movie, and a variety of additional data services, such as real-time news information and traffic information. In particular, terrestrial DMB (T-DMB) can combine video, audio, and data services onto a single broadcast frequency called an ensemble to implement a service application.

A DMB receiver that receives DMB provides various services, such as a dynamic label service (DLS), a slide show service (SLS), a broadcasting web service (BWS), an electronic program guide (EPG), and a transport protocol experts group (TPEG), all of which are data services, in addition to basic services, such as DMB video and DAB audio. The DLS is a data service that decodes program associated data (hereinafter referred to as PAD) information included in a DAB signal and extracts DLS data, i.e., text or string information, from the decoded PAD information without decoding the DMB video or the DAB audio.

However, in order to use the DLS service during the execution of any application, such as MP3 audio playback, video playback, a text viewer, photo playback, a main menu, an additional calculator, a clock, an alarm, an electronic dictionary, a game, or a scheduler, a conventional DMB receiver must interrupt the application that is being executed in order to execute a DAB radio application so as to be able to use the DLS service.

SUMMARY OF THE INVENTION

Several aspects and example embodiments of the invention provide an apparatus and method for displaying a digital multimedia broadcasting service that is capable of always displaying a DLS even during the execution of any application in a DMB receiver.

It is another aspect of the invention to provide an apparatus and method for displaying a digital multimedia broadcasting service that is capable of performing an operation of parsing a DLS of a DAB as a background operation and displaying the DLS in a ticker form in a portion of a screen even during the execution of any application.

According to an aspect of the invention, a method of displaying a digital multimedia broadcasting service includes determining whether additional data carried in a digital audio broadcasting (DAB) signal is received while any application is being executed; and displaying the executed application and the received additional data together on one screen when the additional data is received.

According to an aspect of the invention, the determining of whether the additional data is received includes parsing a dynamic label service (DLS) carried in the DAB signal as a background operation performed while the application is being executed.

According to an aspect of the invention, the parsing of the DLS as the background includes applying power to a signal receiver to receive the DAB signal; decoding program associated data (PAD) information carried in the DAB signal received by the signal receiver; and extracting DLS data from the decoded PAD information.

According to an aspect of the invention, the displaying of the executed application and the received additional data together on the one screen includes displaying the extracted DLS data in a portion of the one screen in a ticker form.

According to an aspect of the invention, the method further includes displaying an icon next to the DLS data displayed in the ticker form that, when pressed by a user, displays a list of channels from which the user can select a desired DLS service.

According to an aspect of the invention, the displaying of the executed application and the received additional data together on the one screen includes displaying the received additional data in a portion of the one screen in a ticker form.

According to an aspect of the invention, the application is at least one of a plurality of applications that can be executed in a digital multimedia broadcasting receiver.

According to an aspect of the invention, the additional data includes news information or traffic information.

According to an aspect of the invention, a method of displaying a digital multimedia broadcasting service includes executing any application; displaying the executed application on a screen; determining whether additional data carried in a digital audio broadcasting (DAB) signal is received while the application is being executed; and displaying the received additional data in a portion of the screen on which the executed application is being displayed when the additional data is received.

According to an aspect of the invention, the application is at least one of a plurality of applications that can be executed in a digital multimedia broadcasting receiver.

According to an aspect of the invention, the additional data includes news information or traffic information.

According to an aspect of the invention, the determining of whether the additional data is received may include parsing a dynamic label service (DLS) carried in the DAB signal as a background operation performed while the application is being executed.

According to an aspect of the invention, the parsing of the DLS as a background operation includes applying power to a signal receiver to receive the DAB signal; decoding program associated data (PAD) information carried in the DAB signal received by the signal receiver; and extracting DLS data from the decoded PAD information.

According to an aspect of the invention, the displaying of the received additional data includes displaying the extracted DLS data in the portion of the screen in a ticker form.

According to an aspect of the invention, the displaying of the received additional data includes displaying the received additional data in the portion of the screen in a ticker form.

According to an aspect of the invention, an apparatus for displaying a digital multimedia broadcasting service an application processor to execute any application; a signal receiver to receive a digital audio broadcasting (DAB) signal carrying additional data while the application processor is executing the application; a display unit to display the executed application and the received additional data; and a controller to control the display unit to display the executed application and the received additional data together on one screen.

According to an aspect of the invention, the apparatus includes a power supply source to apply power to the signal receiver to receive the DAB signal as a background operation performed while the application processor is executing the application; and a data decoder to decode program associated data (PAD) information carried in the DAB signal received by the signal receiver and extract dynamic label service (DLS) data from the decoded PAD information as a background operation performed while the application processor is executing the application.

According to an aspect of the invention, the display unit displays the extracted DLS data in a portion of the one screen in a ticker form.

According to an aspect of the invention, the display unit displays the received additional data in a portion of the one screen in a ticker form.

According to an aspect of the invention, the application processor executes at least one of a plurality of applications that can be executed in a digital multimedia broadcasting receiver.

According to an aspect of the invention, the additional data includes news information or traffic information.

According to an aspect of the invention, a method of displaying a digital multimedia broadcasting (DMB) service includes executing a selected application other than an application for displaying a selected DMB service; receiving data carried by the selected DMB service while the selected application is being executed; and displaying the executed application and the received data together on one screen.

In an apparatus and method for displaying the digital multimedia broadcasting service according to aspects of the invention, since an operation of parsing a DLS of DAB is performed as a background operation even during the execution of any application and the DLS data is displayed in a portion of a screen in a ticker form in a DMB receiver, it is possible to always view news information or traffic information without interrupting the application which is being executed. Accordingly, it is possible to make the DMB receiver more convenient for a user.

Additional aspects and/or advantages of the invention will be set forth in part in the description that follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
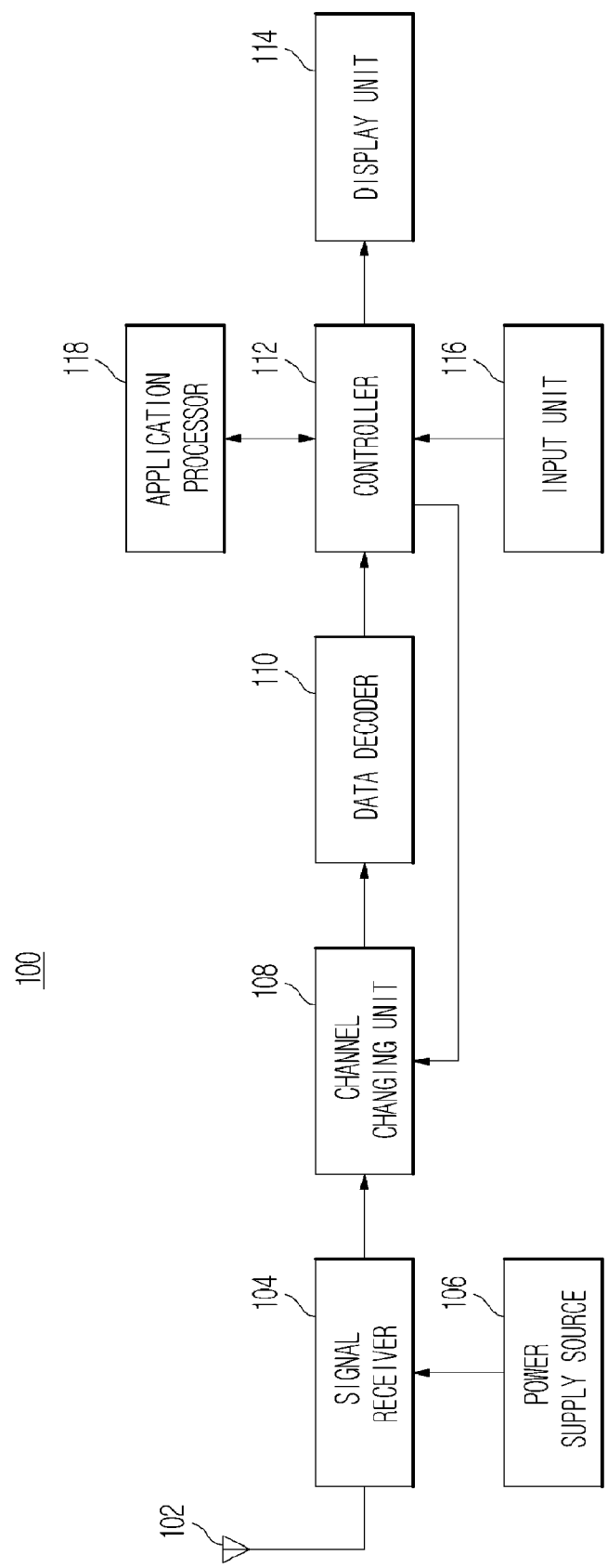
FIG. 1 is a block diagram of a DMB receiver according to an example embodiment of the invention.

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only, and that the invention is not limited thereto. The spirit and scope of the invention are limited only by the terms of the claims. The following represents brief descriptions of the drawings, wherein:

FIG. 1 is a block diagram of a DMB receiver according to an example embodiment of the invention.

As shown in FIG. 1, the DMB receiver 100 according to the example embodiment includes a signal receiver 104, a power supply source 106, a channel changing unit 108, a data decoder 110, a controller 112, a display unit 114, an input unit 116, and an application processor 118.

The signal receiver 104 receives DMB signals having various contents that are provided through digital satellite broadcasting, digital cable broadcasting, or digital terrestrial broadcasting through an antenna 102.

The power supply source 106 supplies power to the signal receiver 104 so that PAD information can be always received through a PAD service in a DAB signal even during the execution of any application in the DMB receiver 100.

The channel changing unit 108 is a channel control task for selecting a channel desired by a user and outputting a DMB signal received over the desired channel to the data decoder 110.

The data decoder 110 is a data service task that is performed as a background operation while low power is being supplied to the signal receiver 104 by the power supply source 106. The data decoder 110 decodes the PAD information in the DAB signal that is transmitted over the channel selected by the channel changing unit 108 and extracts DLS data from the decoded PAD information.

The controller 112 is a processor for controlling the overall operation of the DMB receiver 100. The controller 112 controls the display unit 114 to display an operation state of an application that is currently being executed.

The controller 112 also controls the display unit 114 so that the DLS data extracted by the data decoder 110 is displayed in a ticker form together with the operation state of any application being executed that is currently being displayed on the display unit 114.

The display unit 114 has a screen for displaying the operation state of the application that is currently being executed according to a control command of the controller 112. The display unit 114 displays string or text information in a specific area 120 of the screen in a ticker form (see FIG. 6) so that the user can always view string or text the information when the DLS data is extracted by the data decoder 110.

The string or text information that is displayed in the specific area 120 of the screen in the ticker form allows a ticker service, such as real-time news information, stock market conditions, and traffic information, to be displayed even during the execution of a specific application. The string or text information that is displayed in the specific area 120 of the screen in the ticker form is automatically updated whenever the DLS data of the PAD information received through the signal receiver 104 changes.

The input unit 116 is a user interface that inputs a user command to select a desired channel or operate a desired application through a graphic user interface (GUI).

The application processor 118 executes an application selected by the user from various applications that can be executed by the DMB receiver 100, such as MP3 audio playback, video playback, a text viewer, photo playback, a main menu, an additional calculator, a clock, an alarm, an electronic dictionary, a game, and a scheduler according to a control command of the controller 112. The application processor 118 executes the application as a foreground operation while the data decoder 110 that is a data service task is being performed as a background operation.

Figure 2:
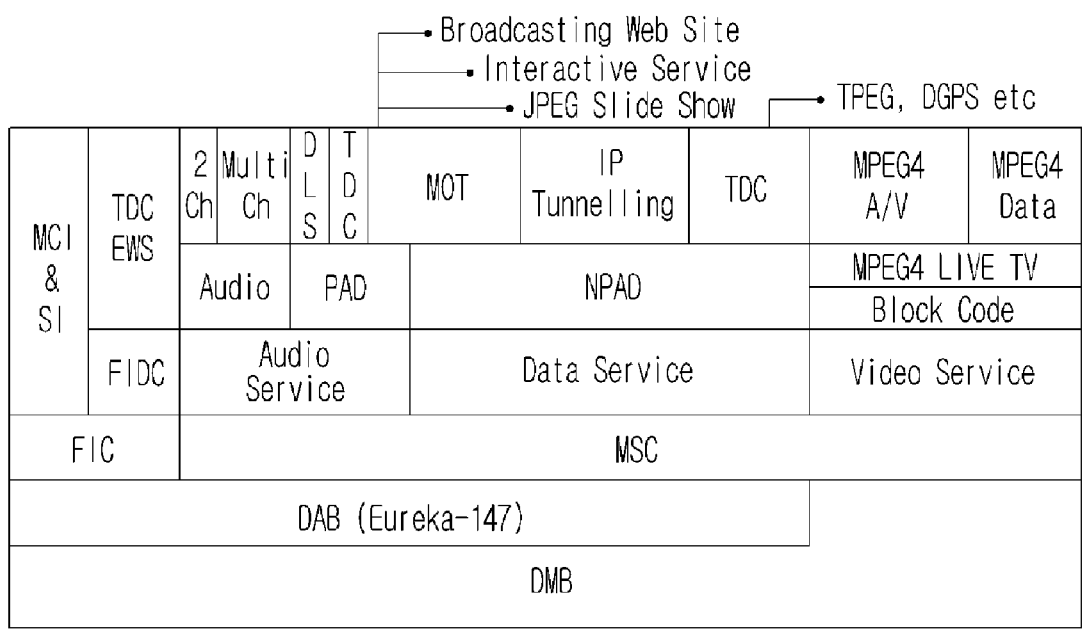
FIG. 2 shows the structure of a DLS service in DMB for explaining the principle of an operation of extracting DLS data.

FIG. 2 shows the structure of a DLS service in DMB for explaining the principle of an operation of extracting DLS data. The structure shown in FIG. 2 is well known to those of ordinary skill in the art, and accordingly it will not be described in detail here except as necessary to explain the invention.

As shown in FIG. 2, the DLS is transmitted through the PAD of the audio service, together with a transparent data channel (TDC) and a multimedia object transfer (MOT). The DLS is a messaging service included in a DAB audio frame. The maximum number of characters that can be simultaneously transmitted is 128 if 8-bit characters are used, and up to 64 characters if Unicode characters are used.

The DMB signal that is currently being provided includes an additional data service, such as weather or traffic information, in addition to basic services, such as DMB video and DAB audio. In the data service, data can be received through a data service using an independent channel or a program associated service in DMB video or DAB audio. For example, in DAB audio, a portion of the DAB audio frame is defined as a PAD area for use in sending information about various data applications. For example, a DLS, a SLS, a BWS, an EPG, and a TPEG may be used together. The DLS is a data service that decodes PAD information included in a DAB signal and extracts DLS data, i.e., string or text information, from the decoded PAD information without decoding the DMB video or the DAB audio. All of these services transmit data in a DAB audio frame. A PAD area for transmitting the PAD information is provided in the DAB audio frame.

Figure 3:
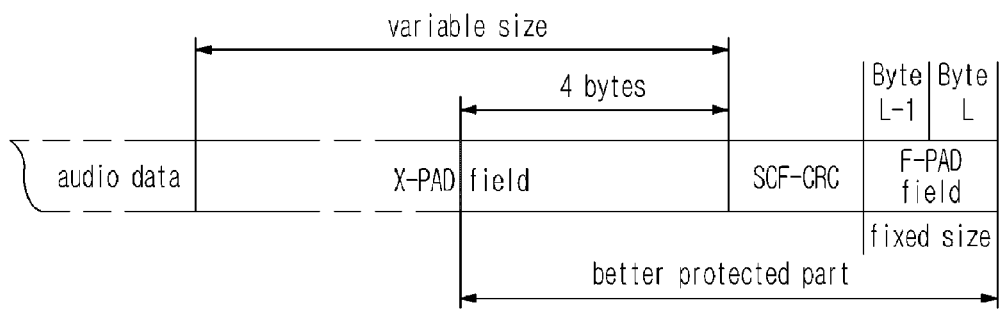
FIG. 3 shows a PAD area in a DAB audio frame.

FIG. 3 shows the PAD area in the DAB audio frame. The configuration and contents of the PAD area shown in FIG. 3 are well known to those of ordinary skill in the art, and accordingly they will not be described in detail here except as necessary to explain the invention.

As shown in FIG. 3, the PAD area in the DAB audio frame is divided into an F-PAD field having a fixed size and an X-PAD field having a fixed size of 4 bytes or a variable size. The DLS is transmitted in the X-PAD field.

The F-PAD field is divided into a byte L-1 and a byte L. If an X-Pad Indicator (X-Pad Ind) (not shown) in byte L-1 of the F-PAD field is '00', this indicates that the X-PAD field is not included in the DAB audio frame. If the X-Pad Ind is '01', this indicates that a short X-PAD field of 4 bytes is included in the DAB audio frame. If the X-Pad Ind is '10', this indicates that a variable size X-PAD field is included in the DAB audio frame. If a Contents Indicator (CI) flag (not shown) in the byte L of the F-PAD field is '0', this indicates that there are no contents indicators in the X-PAD field. If the CI flag is '1', this indicates that there is at least one contents indicator in the X-PAD field. For DLS, the X-Pad Ind will always be '01' or '10', and the CI flag will always be '1'.

The X-PAD field includes at least one X-PAD data sub-field (no shown), and possibly one or more contents indicators (CI) field (not shown). A CI field in a short X-PAD field includes an Application Type (AppTy) field (not shown) specifying an application type of data that is being transmitted in the associated X-PAD data sub-field. A CI field in a variable size X-PAD field includes a Length field (not shown) indicating the length of the associated X-PAD data sub-field (4, 6, 8, 12, 16, 24, 32, or 48 bytes), and an AppTy field. For DLS, the AppTy field is '2' for a start of an X-PAD data group, and '3' for a continuation of an X-PAD data group. DLS data may include up to 8 segments, each including up to 16 characters. Each segment is carried in one X-PAD data group. Further details of the X-PAD field for DLS are described in European Standard ETSI EN 300 401, V1.4.1, June 2006, Radio Broadcasting Systems; Digital Audio Broadcasting (DAB) to mobile, portable and fixed receivers, which is incorporated herein by reference in its entirety.

The apparatus and method for displaying the digital multimedia broadcasting service according to aspects of the invention and the operation and effect thereof will now be described.

Figure 4:
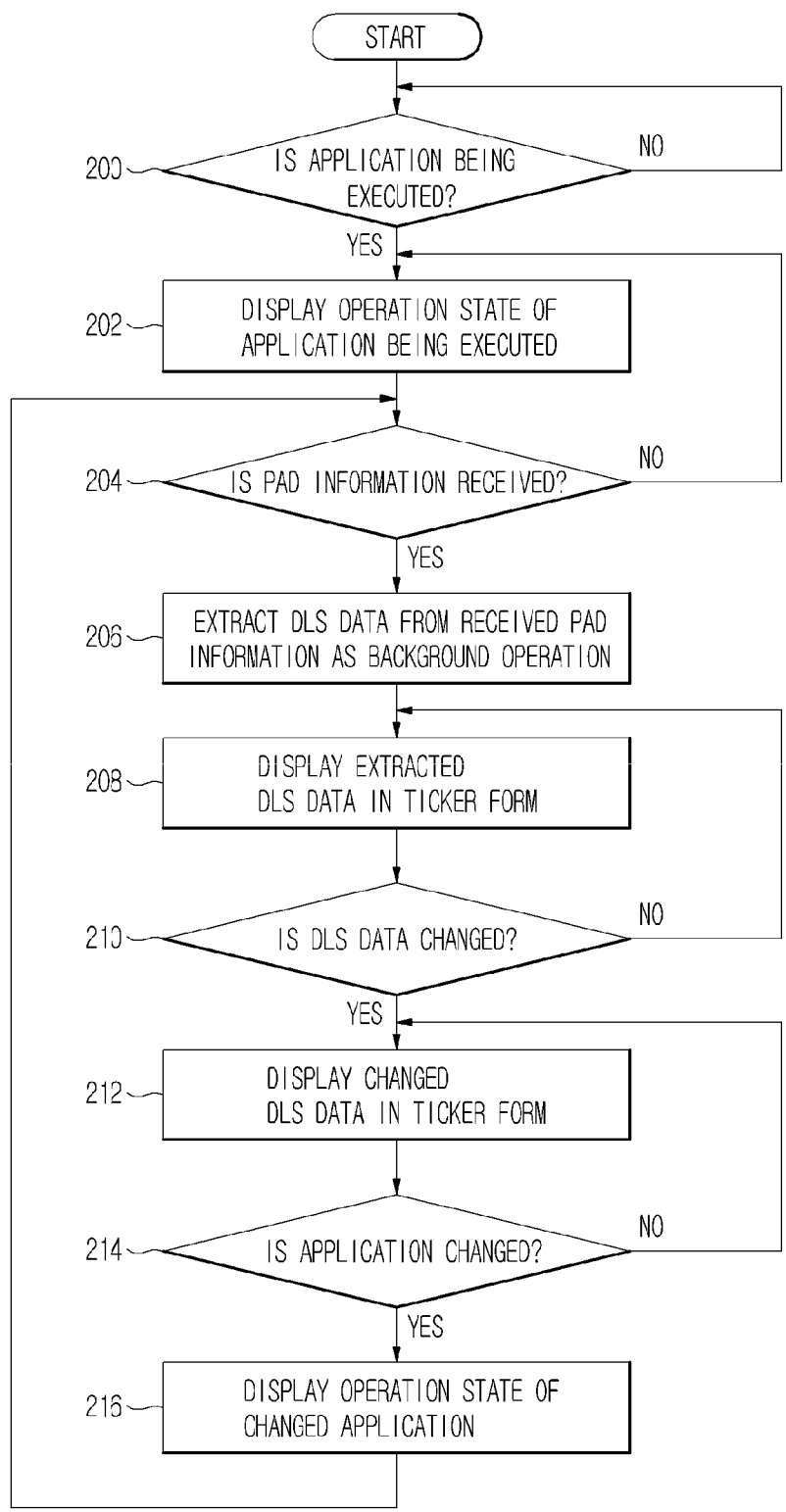
FIG. 4 is a flowchart of a method of displaying a DLS service in the DMB receiver of FIG. 1 according to an example embodiment of the invention.

FIG. 4 is a flowchart of a method of displaying a DLS service in the DMB receiver of FIG. 1 according to an example embodiment of the invention.

As an initial condition for describing the operation of the invention, it is assumed that low power is supplied to the signal receiver 104 of the DMB receiver 100 by the power supply source 106.

In FIG. 4, the controller 112 determines whether a specific application (for example, video playback) of a plurality of applications that can be executed in the DMB receiver 100, such as MP3 audio playback, video playback, a text viewer, photo playback, a main menu, an additional calculator, a clock, an alarm, an electronic dictionary, a game, and a scheduler, is being executed by the application processor 118 (operation 200).

Figure 5:
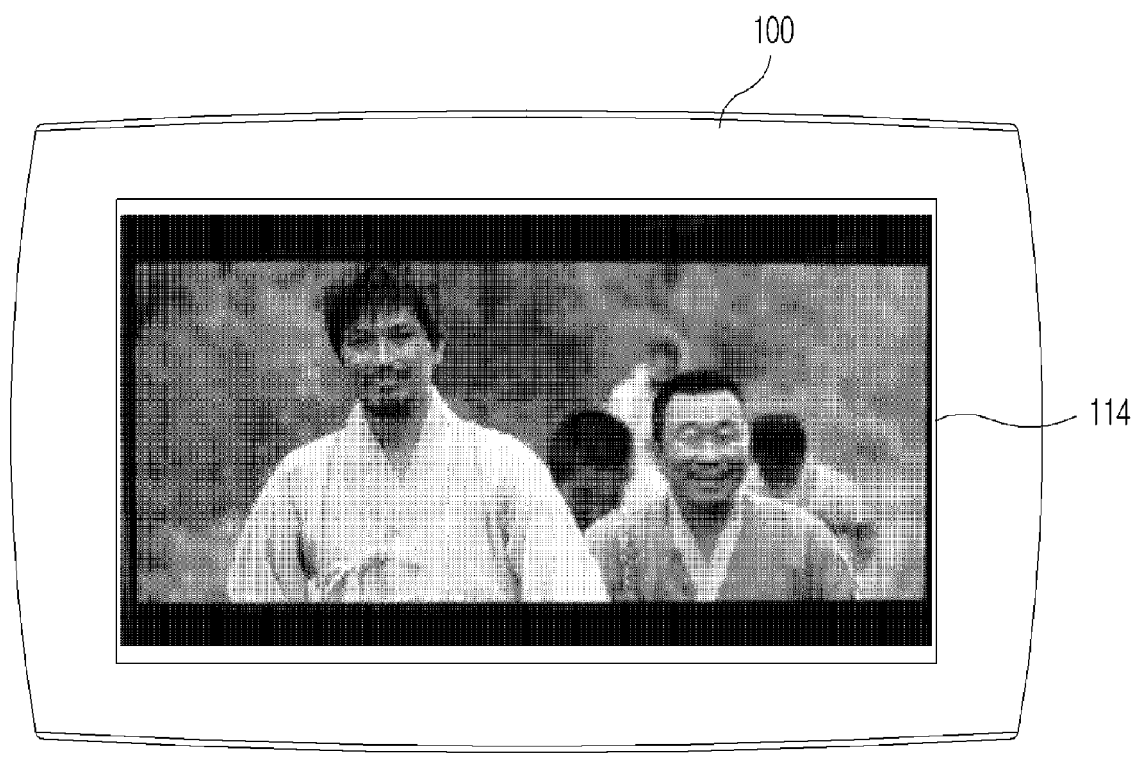
FIG. 5 shows a screen of a display unit when an application being executed is video playback.

If the controller 112 determines in operation 200 that a specific application is being executed, the controller 112 displays the operation state of the application that is being executed on the screen of the display unit 114 as shown in FIG. 5, which shows the operation state of a video playback operation (operation 202). If the controller 112 determines in operation 200 that a specific application is not being executed, the controller 112 repeats operation 200 until the controller 112 determines that a specific application is being executed.

Subsequently, the controller 112 determines whether the PAD information of the DAB audio signal is received by the signal receiver 104 (operation 204). If the controller 112 determines in operation 204 that the PAD information is not received, then the controller 112 returns to operation 202 and continues to display the operation state of the application that is being executed on the screen of the display unit 114 as shown in FIG. 5.

Figure 6:
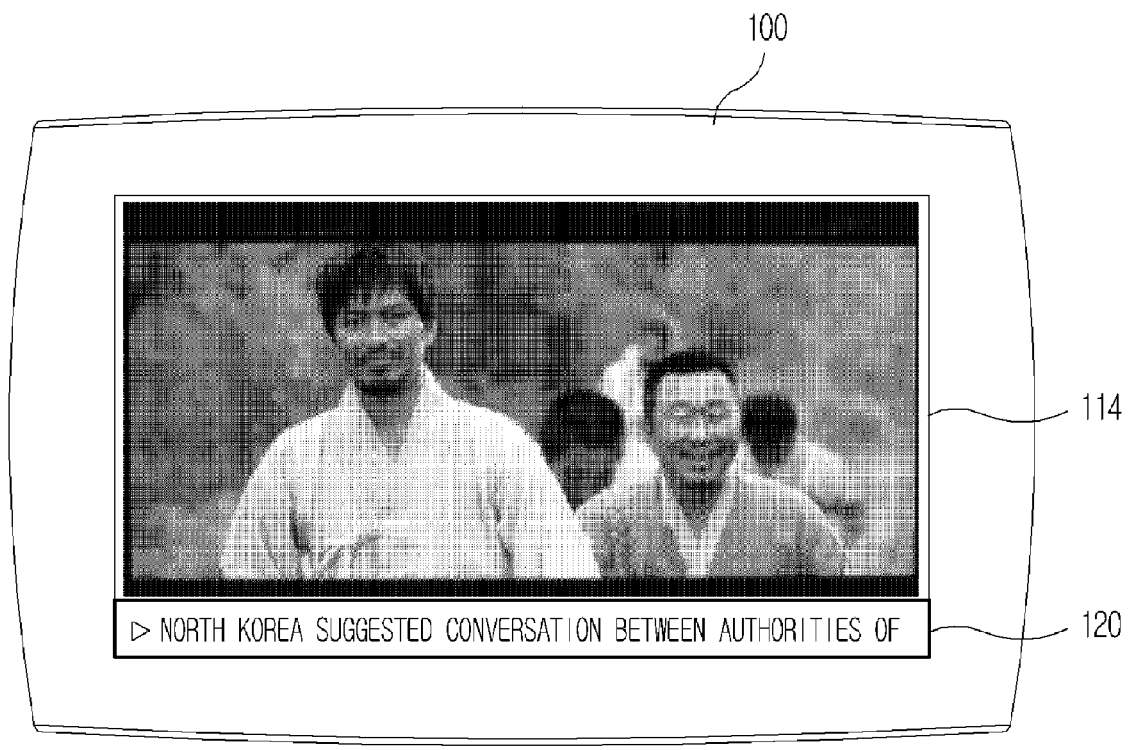
FIG. 6 shows an example of a display of a DLS service in which news information is displayed in a ticker form on the screen shown in FIG. 5.

If the controller 112 determines in operation 204 that the PAD information is received, then the received PAD information is decoded and the DLS data is extracted from the decoded PAD information by the data decoder 110 operating in the background (operation 206), and the extracted DLS data is displayed in the specific area 120 of the screen of the display unit 114 (for example, a specific area 120 at the bottom of the screen of the display unit 114) in a ticker form according to a control command of the controller 112 as string or text information as shown in FIG. 6, which shows an example in which news information is displayed in the specific area 120 (operation 208). However, it is understood that the specific area 120 can have different shapes and can be located at different positions on the screen of the display unit 114.

An operation for extracting the DLS data in the DMB receiver will now be described in detail.

The channel changing unit 108 always monitors input data using the fast information channel (FIC) data shown in FIG. 2, monitors an interrupt signal (not shown) that is generated whenever data is received, and receives MPEG-2 transport stream (TS) data from the signal receiver 104. The FIC data is well known to one of ordinary skill in the art, and accordingly, it will not be described in detail here. Details of the FIC data are described in European Standard ETSI EN 300 401 referred to above.

The data decoder 110 receives the MPEG-2 TS data whenever the interrupt signal is generated, parses the MPEG-2 TS data, and stores a header of the MPEG-2 TS data in a memory (not shown) of the controller 112.

The MPEG-2 TS data parsed by the data decoder 110 is divided into main service channel (MSC) data and the FIC data as shown in FIG. 2. The MSC data includes audio and video data in a stream mode. As discussed above, the PAD area is located at the end of a DAB audio frame.

The data decoder 110 decodes the PAD information, extracts the DLS data from the decoded PAD information, and outputs the extracted DLS data to the controller 112.

Accordingly, while the DMB receiver 100 is executing any application, the data decoder 110 performs the operation of decoding the PAD information and extracting the DLS data from the decoded PAD information as a background operation, and displays the extracted DLS data as string or text information in the specific area 120 of the screen of the display unit 114 in a ticker form as shown in FIG. 6.

While the DLS data is being displayed in the ticker form as shown in FIG. 6 during the execution of the application, the controller 112 determines whether the DLS data is changed (operation 210). If the controller 112 determines in operation 210 that the DLS data is not changed, then the controller 112 returns to operation 208 and the extracted DLS data continues to be displayed in the specific area 120 of the screen of the display unit 114 in the ticker form as shown in FIG. 6.

Figure 7:
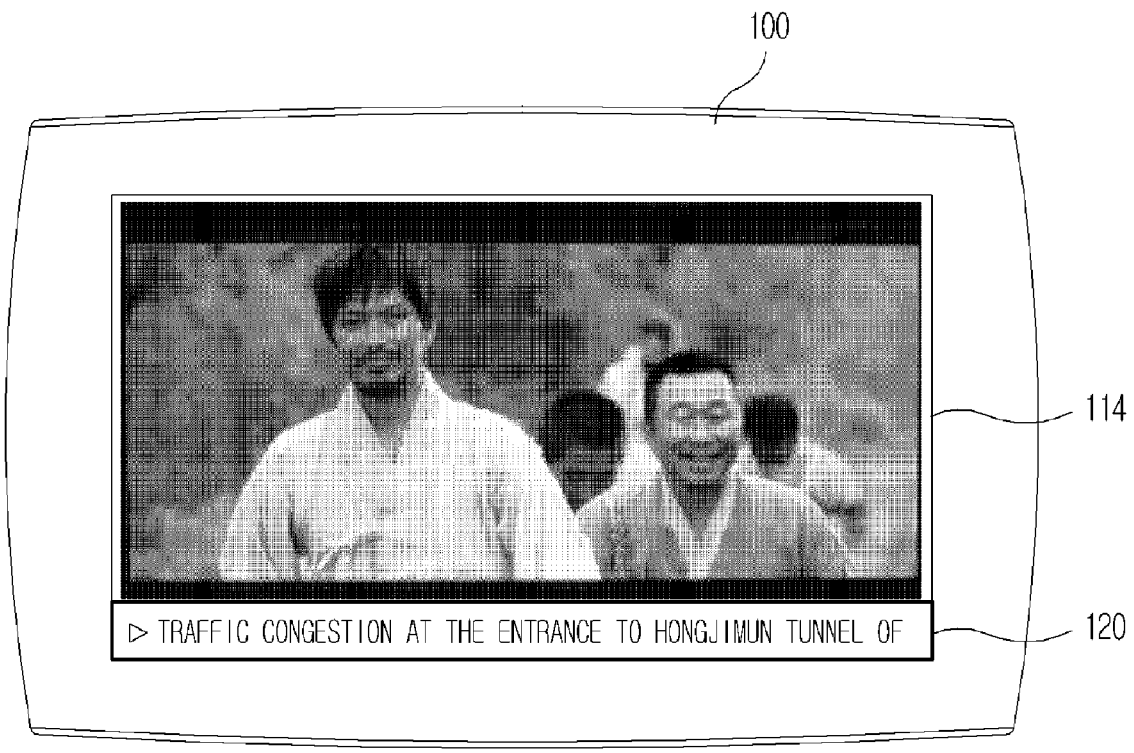
FIG. 7 shows an example of a display of a DLS service in which traffic information is displayed in a ticker form on the screen shown in FIG. 5.

If the controller 112 determines in operation 210 that the DLS data is changed, then the data decoder 110, which is still operating in the background, displays the changed DLS data in the specific area 120 of the screen of the display unit 114 in the ticker form as string or text information according to a control command of the controller 112 as shown in FIG. 7, which shows an example in which traffic information is displayed in the specific area 120, thereby replacing the news information that was previously displayed in the specific area 120 as shown in FIG. 6 (operation 212).

The data decoder 110 extracts the string or text information whenever the received DLS data is changed. Accordingly, the string or text information that is displayed in the specific area 120 of the screen of the display unit 114 in the ticker form is updated each time the received DLS data is changed.

In addition, if the user inputs a command to change the channel the input unit 116, the channel is changed by the channel changing unit 108, and the string or text information of the changed channel is extracted and displayed in the specific area 120 of the display unit 114 in the ticker form.

As a result, if only the channel changing unit 108 and the data decoder 110 are operated without actually operating tasks for decoding the audio and the video, a structure for decoding only the PAD information and extracting the DLS data from the decoded PAD information with a low power consumption can be realized. This makes it possible to implement a ticker service even during the execution of any application while the decoding of the PAD information and the extracting of the DLS data from the decoded PAD information is being performed as a background operation.

Figure 8:
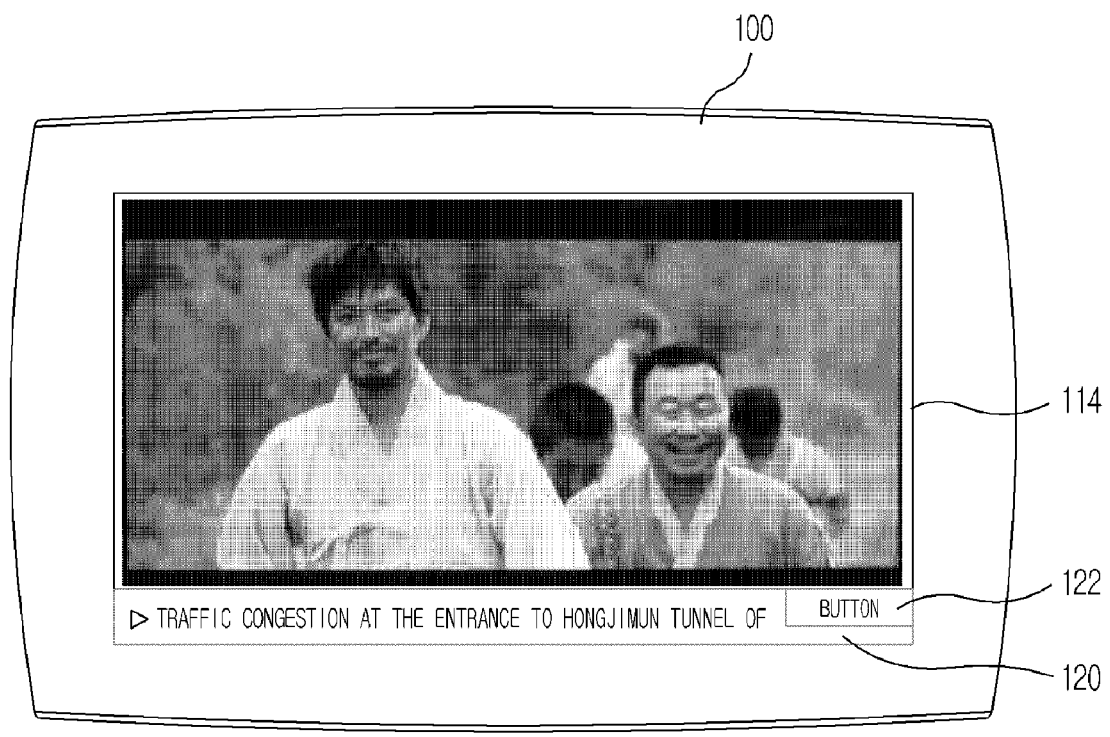
FIG. 8 shows an example in which a button for selecting a channel is displayed at a specific position in the display of a DLS service shown in FIG. 7.

The string or text information displayed in the specific area 120 of the screen of the display unit 114 in the ticker form may include real-time news information as shown in FIG. 6, stock market conditions (not shown), and traffic information as shown in FIG. 7, and the ticker service can be received even during the execution of the specific application. An icon, such as a button 122, for selecting a channel may be displayed next to the string or text information in the specific area 120 of the screen of the display unit 114 as shown in FIG. 8. If the button 122 is pressed, the channel may be changed to a desired channel and string or text information from the desired channel may be received. If necessary, an icon for switching to a DAB service for displaying the string or text information may be provided as a convenience for the user.

Figure 9:
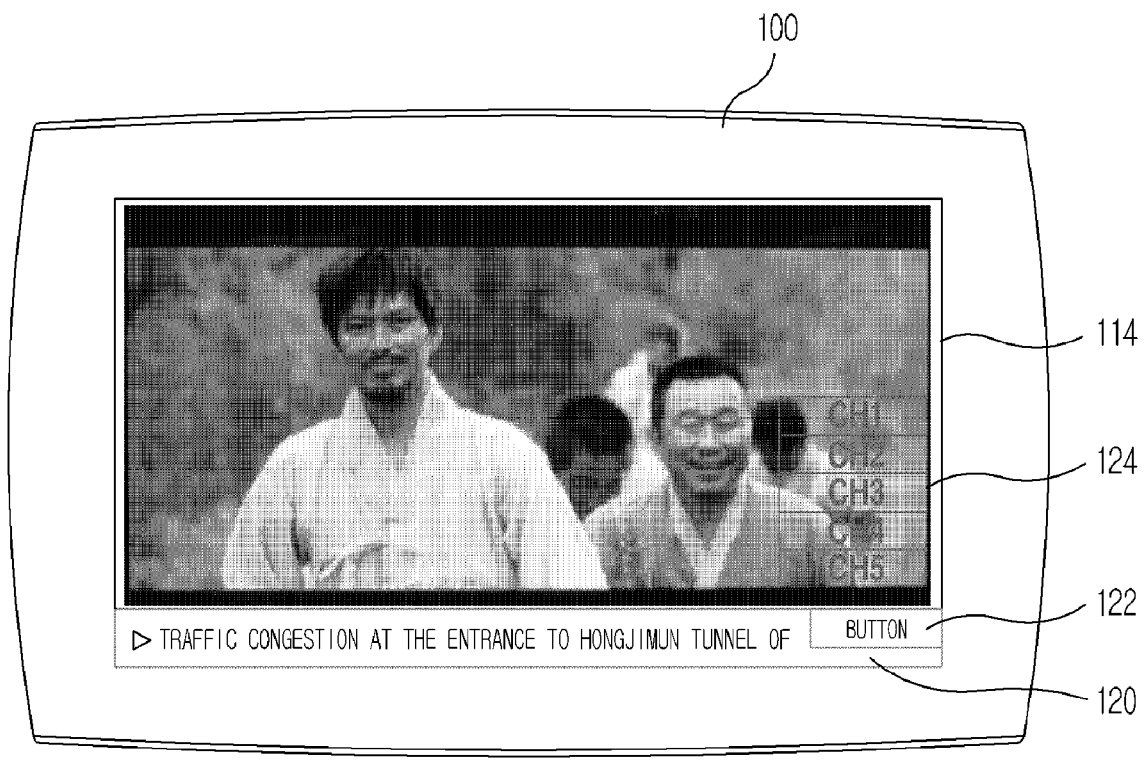
FIG. 9 shows a list of channels that can be received that is displayed when the button shown in FIG. 8 is pressed.

More specifically, if the icon, such as the button 122, is at a specific position on the screen of the display unit 114, such as next to the string or text information in the specific area 120 of the screen of the display unit 114 as shown in FIG. 8, and the user wants to change the channel while the DLS service is being displayed, a list of channels 124 that can currently be received is displayed as shown in FIG. 9 when the user presses the button 122, and the user selects a channel from the list of channels so that the DLS service is changed, or is directly switched to a desired DLS service.

Referring back to FIGS. 1 and 4, if the user changes the application he or she wants to execute using the input unit 116, the controller 112 receives the user command from the input unit 116 and determines whether the application (for example, MP3 audio playback, an electronic dictionary, a game, a clock, an alarm, or the like) is changed (operation 214). If the controller 112 determines in operation 214 that the application is not changed, then the controller returns to operation 212 and performs the operations subsequent thereto.

If the controller 112 determines in operation 214 that the application is changed, then the controller 112 displays the operation state of the changed application on the screen of the display unit 114 as shown in FIGS. 10 to 13 (operation 216), returns to operation 204, and performs the operations subsequent thereto.

Figure 10:
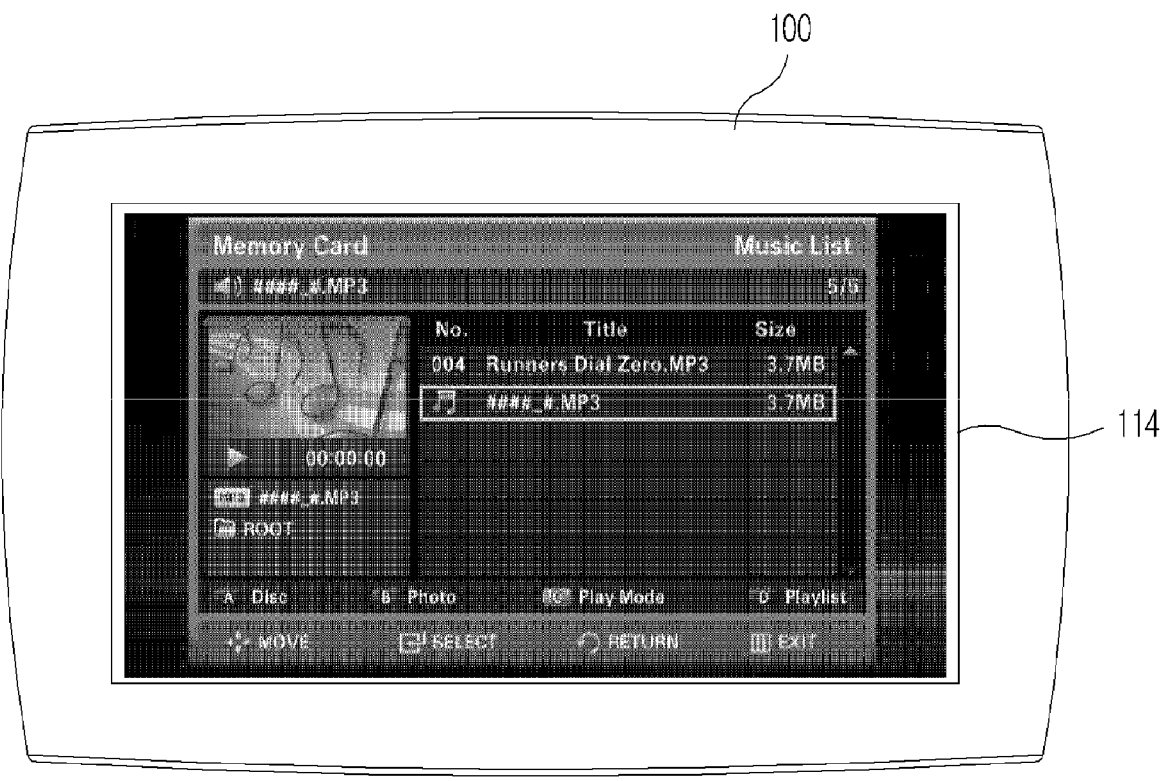
FIG. 10 shows a screen of a display unit when an application being executed is MP3 audio playback.
Figure 11:
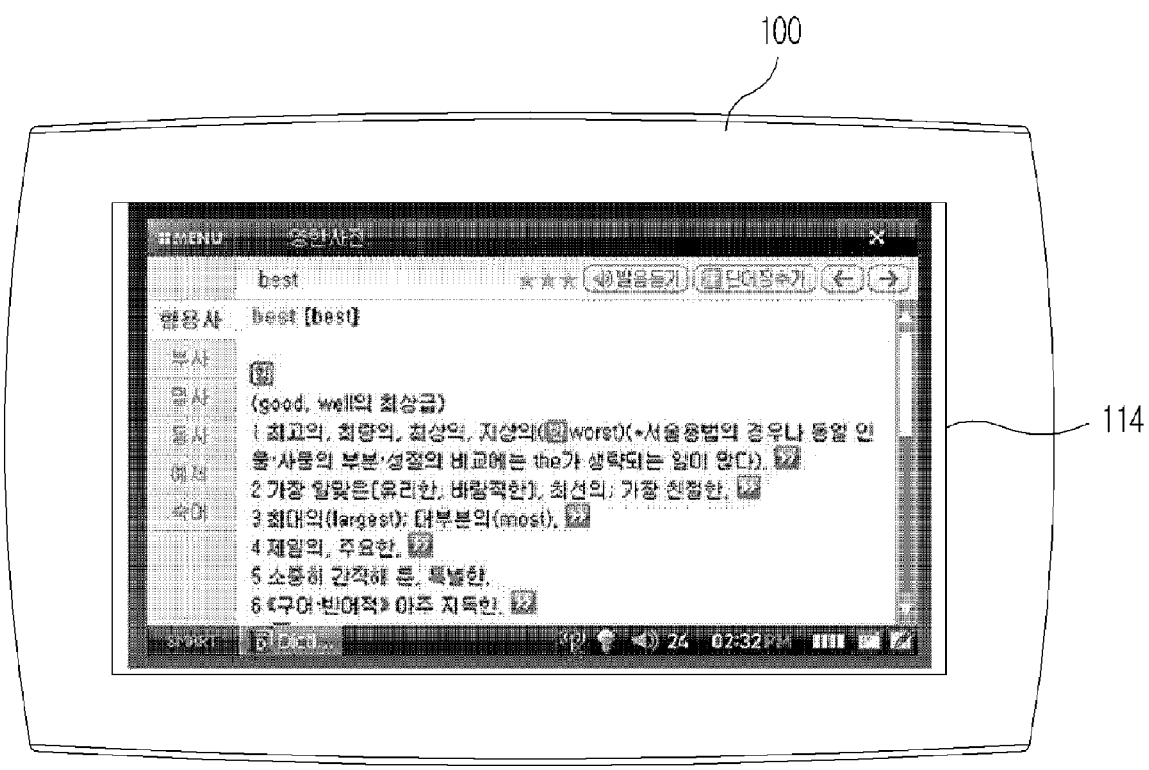
FIG. 11 shows a screen of a display unit when an application being executed is an electronic dictionary.
Figure 12:
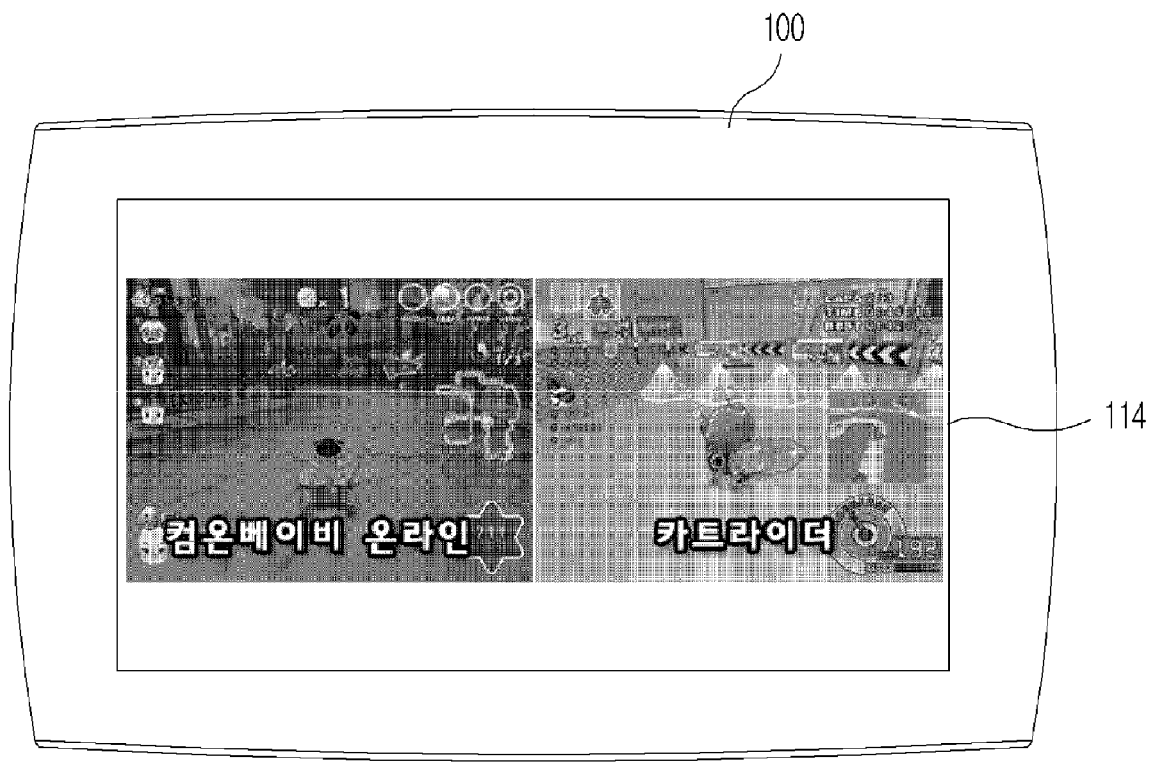
FIG. 12 shows a screen of a display unit when an application being executed is a game.
Figure 13:
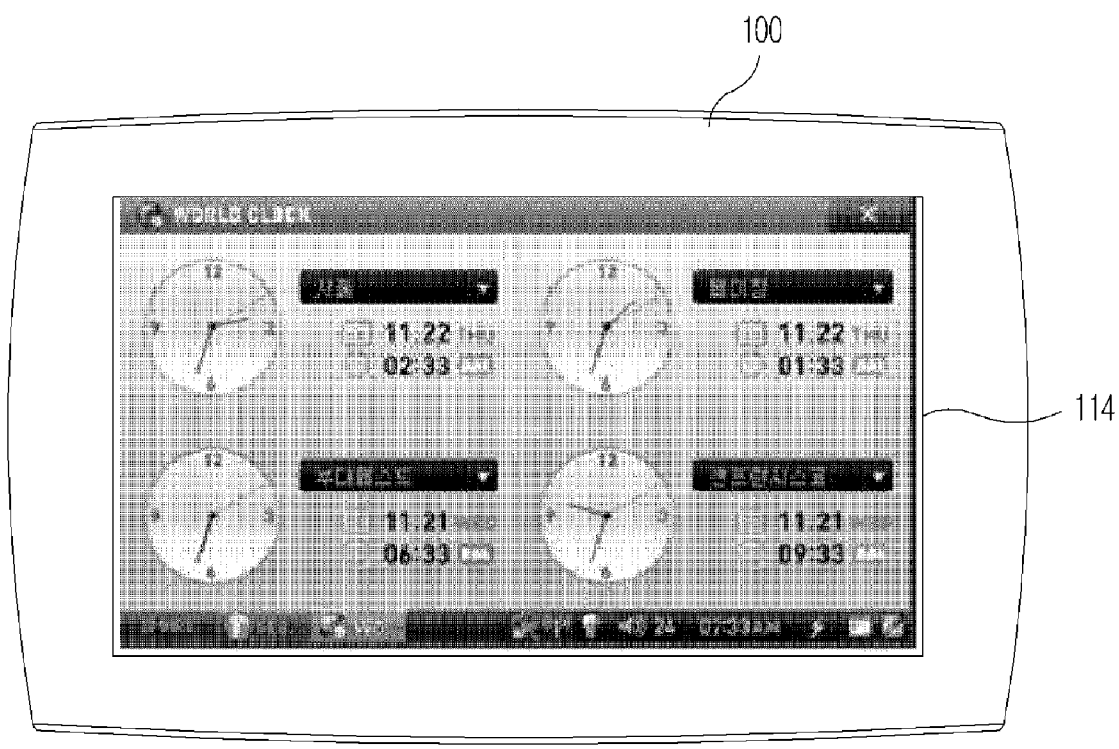
FIG. 13 shows a screen of a display unit when an application being executed is a clock.

FIG. 10 shows the screen of the display unit 114 when the application being executed is MP3 audio playback; FIG. 11 shows the screen of the display unit 114 when the application being executed is an electronic dictionary; FIG. 12 shows the screen of the display unit 114 when the application being executed is a game; and FIG. 13 shows the screen of the display unit 114 when the application being executed is a clock.

Figure 14:
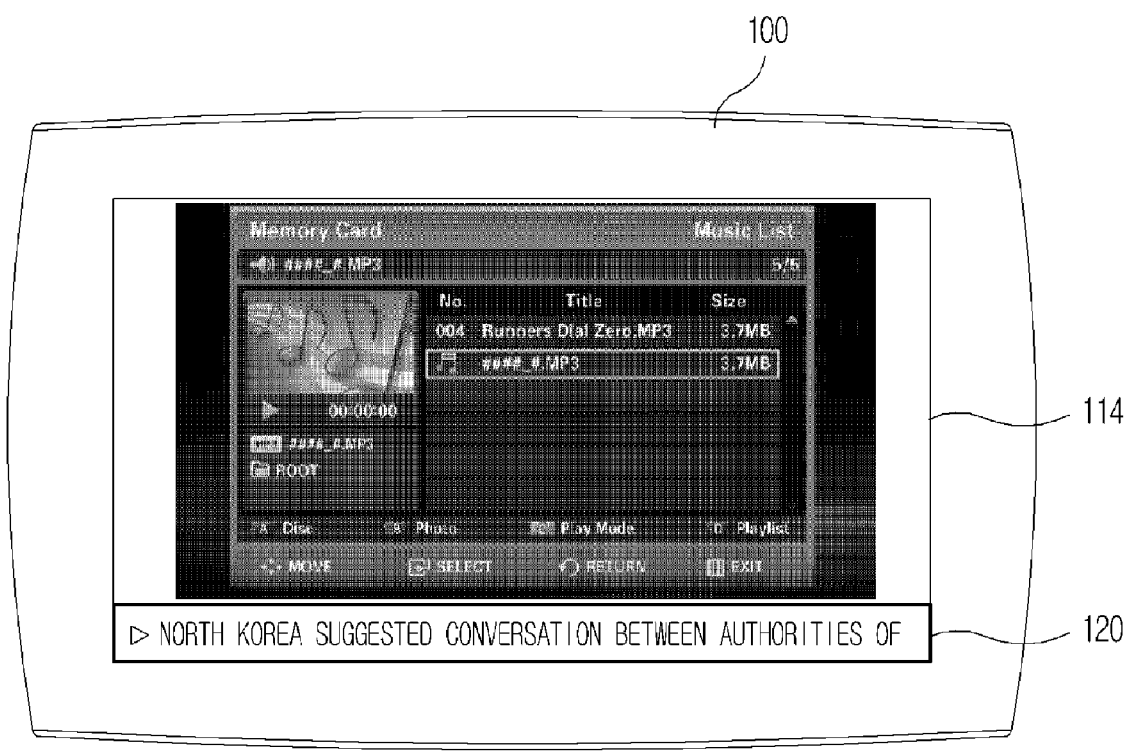
FIG. 14 shows an example of a display of a DLS service in which news information is displayed in a ticker form on the screen shown in FIG. 10.
Figure 15:
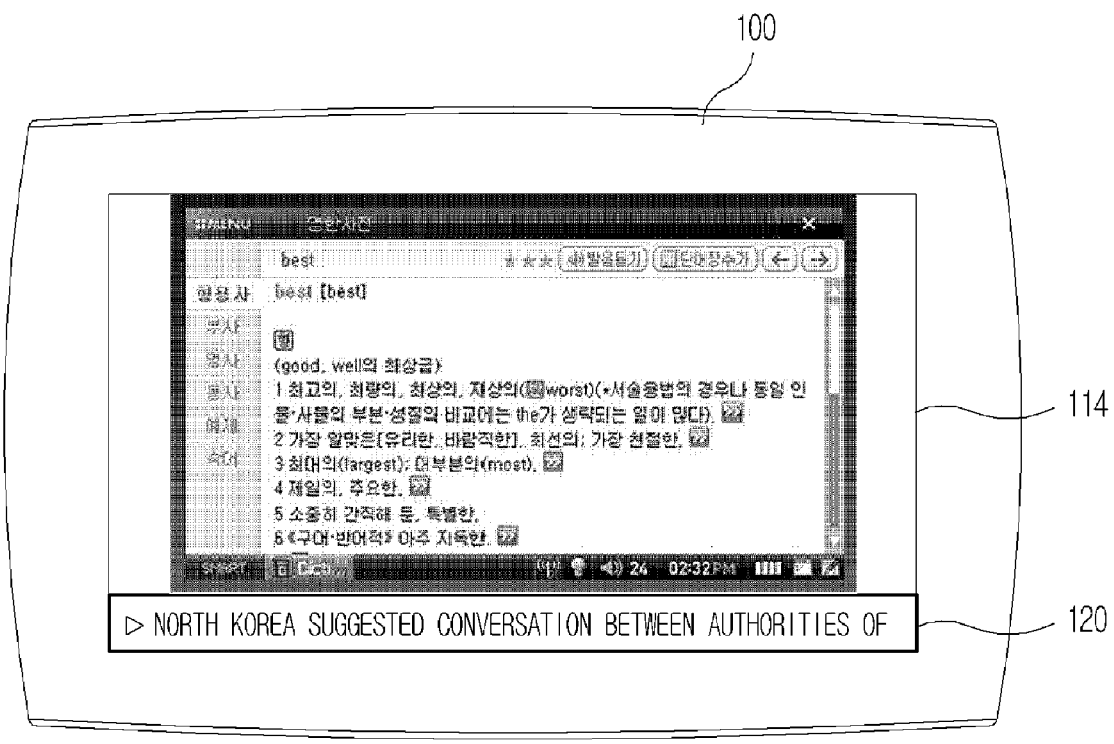
FIG. 15 shows an example of a display of a DLS service in which news information is displayed in a ticker form on the screen shown in FIG. 11.
Figure 16:
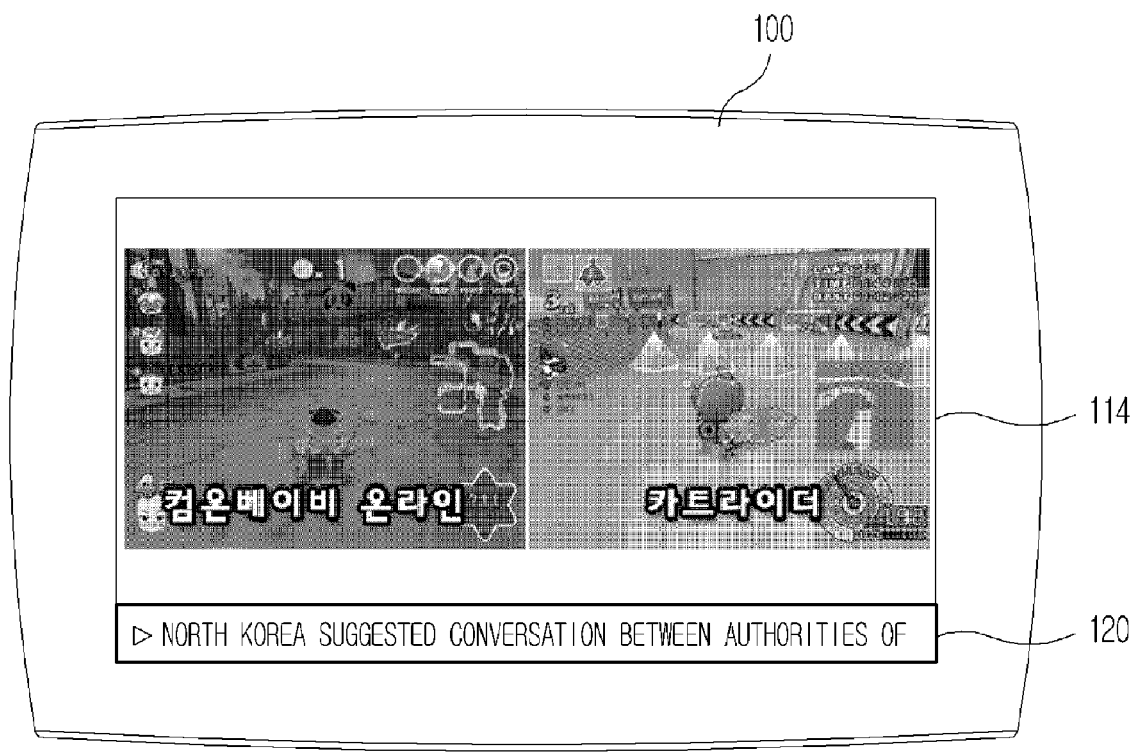
FIG. 16 shows an example of a display of a DLS service in which news information is displayed in a ticker form on the screen shown in FIG. 12.
Figure 17:
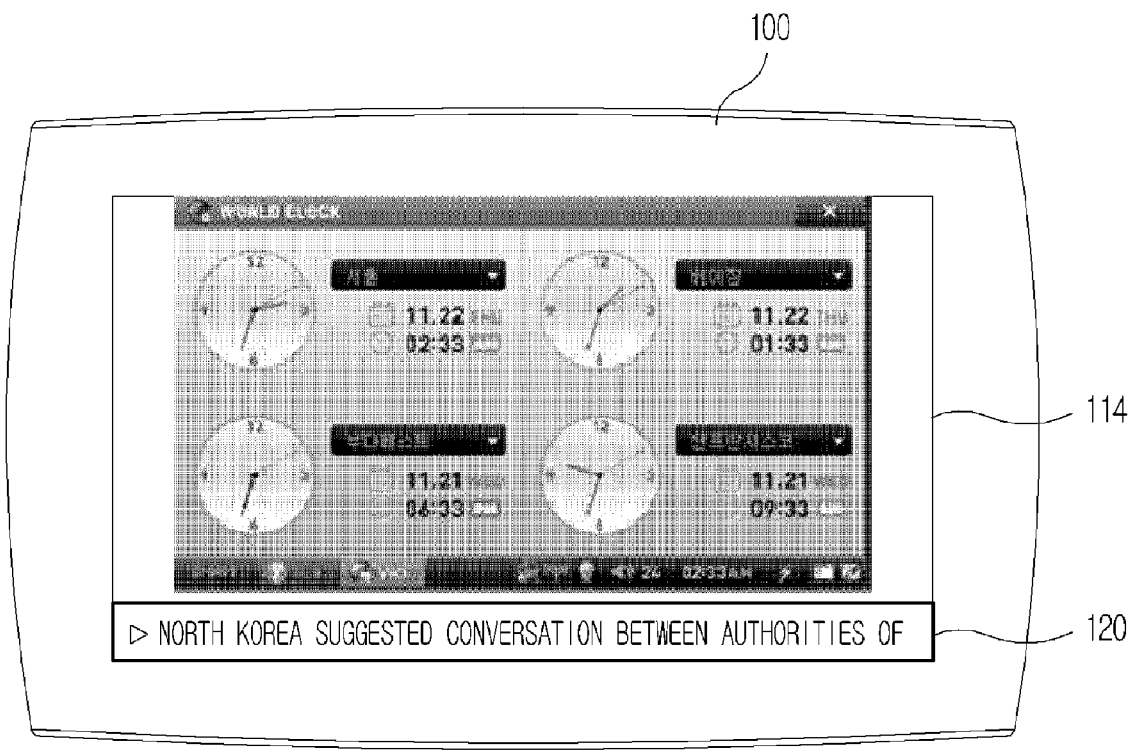
FIG. 17 shows an example of a display of a DLS service in which news information is displayed in a ticker form on the screen shown in FIG. 13.

If the PAD information is received while the operation state of the changed application is being displayed as shown in FIGS. 10-13, the extracted DLS data is displayed in the specific area 120 of the screen of the display unit 114 in the ticker form as shown in FIGS. 14 to 17, in which the displayed DLS data is news information. Thus, FIG. 14 shows the screen of the display unit 114 when the application being executed is MP3 audio playback, with news information being displayed in a ticker form; FIG. 15 shows the screen of the display unit 114 when the application being executed is an electronic dictionary, with news information being displayed in a ticker form; FIG. 16 shows the screen of the display unit 114 when the application being executed is a game, with news information being displayed in a ticker form; and FIG. 17 shows the screen of the display unit 114 when the application being executed is a clock, with news information being displayed in a ticker form.

As a result, according to aspects of the invention, if the additional data service carried in the DAB signal is received during the execution of an application, the application being executed and the additional data are displayed together on one screen of the display unit 114, with the additional data being displayed as string or text information in a ticker form. Also, if the user changes the channel, the string or text information of the changed channel is displayed. Also, a button or other icon can be displayed next to the string or text information displayed in the ticker form that, when pressed by a user, displays a list of channels from which the user can select a desired DLS service of the DAB signal.

The apparatus in FIG. 1 can be implemented, for example, as a chipset, and/or other hardware, and/or one or more processors, and/or a special-purpose computer, and/or a general-purpose computer, one or more of which is programmed to perform part or all of the method described with reference to FIGS. 1-17.

While there have been illustrated and described what are considered to be example embodiments of the invention, it will be understood by those skilled in the art that as technology develops, various changes and modifications may be made, and equivalents may be substituted for elements thereof, without departing from the true scope of the invention. Many modifications, permutations, additions, and sub-combinations may be made to adapt the teachings of the invention to a particular situation without departing from the scope thereof. Accordingly, it is intended, therefore, that the invention not be limited to the various example embodiments disclosed herein, but that the invention include all embodiments falling within the scope of the claims and their equivalents.

What is claimed is:

1. A method of displaying a digital multimedia broadcasting service, the method comprising:
   determining whether additional data carried in a Digital Audio Broadcasting (DAB) signal is received while an application is being executed; and
   displaying the application being executed and the received additional data together on one screen when the additional data is received,
   wherein an execution of the application being executed is unrelated to the displaying of the received additional data.

2. The method of claim 1, wherein the determining of whether the additional data is received comprises parsing a Dynamic Label Service (DLS) carried in the DAB signal as a background operation performed while the application is being executed.

3. The method of claim 2, wherein the parsing of the DLS as the background operation comprises:
   applying power to a signal receiver to receive the DAB signal;
   decoding Program Associated Data (PAD) information carried in the DAB signal received by the signal receiver; and
   extracting DLS data from the decoded PAD information.

4. The method of claim 3, wherein the displaying of the executed application and the received additional data together on the one screen comprises displaying the extracted DLS data in a portion of the one screen in a ticker form.

5. The method of claim 4, further comprising displaying an icon next to the DLS data displayed in the ticker form that, when pressed by a user, displays a list of channels from which the user can select a desired DLS service.

6. The method of claim 1, wherein the displaying of the executed application and the received additional data together on the one screen comprises displaying the received additional data in a portion of the one screen in a ticker form.

7. The method of claim 1, wherein the application is at least one of a plurality of applications that can be executed in a digital multimedia broadcasting receiver.

8. The method of claim 1, wherein the additional data comprises news information or traffic information.

9. A method of displaying a digital multimedia broadcasting service, the method comprising:
   executing an application;
   displaying the executed application on a screen;
   determining whether additional data carried in a Digital Audio Broadcasting (DAB) signal is received while the application is being executed; and
   displaying the received additional data in a portion of the screen on which the application being executed is being displayed when the additional data is received,
   wherein an execution of the application being executed is unrelated to the displaying of the received additional data.

10. The method of claim 9, wherein the application comprises at least one of a plurality of applications that can be executed in a digital multimedia broadcasting receiver.

11. The method of claim 9, wherein the additional data comprises news information or traffic information.

12. The method of claim 9, wherein the determining of whether the additional data is received comprises parsing a Dynamic Label Service (DLS) carried in the DAB signal as a background operation performed while the application is being executed.

13. The method of claim 12, wherein the parsing of the DLS as a background operation comprises:
applying power to a signal receiver to receive the DAB signal;
decoding Program Associated Data (PAD) information carried in the DAB signal received by the signal receiver; and
extracting DLS data from the decoded PAD information.

14. The method of claim 13, wherein the displaying of the received additional data comprises displaying the extracted DLS data in the portion of the screen in a ticker form.

15. The method of claim 9, wherein the displaying of the received additional data comprises displaying the received additional data in the portion of the screen in a ticker form.

16. An apparatus for displaying a digital multimedia broadcasting service, the apparatus comprising:
an application processor for executing an application;
a signal receiver for receiving a Digital Audio Broadcasting (DAB) signal carrying additional data while the application processor is executing the application;
a display unit for displaying the application being executed and the received additional data; and
a controller for controlling the display unit to display the application being executed and the received additional data together on one screen,
wherein an execution of the application being executed is unrelated to the displaying of the received additional data.

17. The apparatus of claim 16, further comprising:
a power supply source for applying power to the signal receiver to receive the DAB signal carrying the additional data as a background operation performed while the application processor is executing the application; and
a data decoder for decoding Program Associated Data (PAD) information carried in the DAB signal received by the signal receiver and extract Dynamic Label Service (DLS) data from the decoded PAD information as a background operation performed while the application processor is executing the application.

18. The apparatus of claim 17, wherein the display unit displays the extracted DLS data in a portion of the one screen in a ticker form.

19. The apparatus of claim 16, wherein the display unit displays the received additional data in a portion of the one screen in a ticker form.

20. The apparatus of claim 16, wherein the application processor executes at least one of a plurality of applications that can be executed in a digital multimedia broadcasting receiver.

21. The apparatus of claim 16, wherein the additional data comprises news information or traffic information.

22. A method of displaying a Digital Multimedia Broadcasting (DMB) service, the method comprising:
executing a selected application other than an application for displaying a selected DMB service;
receiving data carried by the selected DMB service while the selected application is being executed; and
displaying the application being executed and the received data together on one screen,
wherein an execution of the application being executed is unrelated to the displaying of the received additional data.

23. The method of claim 22, wherein the receiving of the data comprises:
receiving a DMB signal carrying the selected DMB service as a background operation performed while the selected application is being executed as a foreground operation; and
extracting the data carried by the selected DMB service from the received DMB signal as a background operation performed while the selected application is being executed as a foreground operation.

24. The method of claim 23, wherein:
the selected application comprises any of a plurality of applications that can be executed in a DMB receiver except the application for displaying the selected DMB service;
the DMB signal comprises a Digital Audio Broadcasting (DAB) signal; and
the selected DMB service comprises a Dynamic Label Service (DLS) carried in the DAB signal.

25. The method of claim 22, wherein the displaying of the executed application and the received data together on one screen comprises displaying the received data in a portion of the one screen in a ticker form.

* * * * *